Oct. 8, 1968                R. J. WONDRA                3,405,352
SQUARE WAVE SWITCHING CIRCUIT HAVING SHARP TURN-ON
AND TURN-OFF CHARACTERISTICS
Filed Oct. 21, 1965

Inventor
Richard J. Wondra
By R J Falkowski
Attorney

United States Patent Office 3,405,352
Patented Oct. 8, 1968

3,405,352
SQUARE WAVE SWITCHING CIRCUIT HAVING SHARP TURN-ON AND TURN-OFF CHARACTERISTICS
Richard J. Wondra, West Allis, Wis., assignor to Allis-Chalmers Manufacturing Company, Milwaukee, Wis.
Filed Oct. 21, 1965, Ser. No. 499,443
10 Claims. (Cl. 324—29.5)

ABSTRACT OF THE DISCLOSURE

A square wave switching circuit having sharp opening and closing characteristics to permit testing of the internal conditions of a fuel cell has the parallel arrangement of an SCR and a pair of relay contacts in series with the fuel cell and a load. An oscillator cyclically turns the relay on and off, and opening of the relay contacts cuts off a short-circuiting transistor and initiates energization of an RC network which fires the SCR after a preselected delay. The sharp turn-on characteristics of the SCR and the sharp turn-off characteristics of the relay contacts provide square wave switching with steep leading and trailing edges.

---

This invention relates to switching means particularly to switching means for cyclically interrupting an electrical current for very short intervals.

It is usually desirable and often necessary to provide means for determining the internal condition of an electrochemical device, such as a fuel cell. One way to accomplish this is to determine the internal resistance of the device by interrupting the current to the load for short intervals to obtain a reading of the voltage of the electrochemical device before polarization becomes significant. When the source and load system is of relatively large power, on the order of ten amperes or more, difficulties are encountered while obtaining the desired sharp rise and fall of current when opening and closing the circuit rapidly.

The sensing may be done at relatively long intervals but with higher power systems it is often desirable to continuously sample the conditions of the source over a selected test period. This is generally accomplished by providing a rapidly operating switch that opens the circuit for a very short period of time. In order to get accurate indications, it may be desirable to utilize an external current source to assume a constant current level. This eliminates any problem that might result from varying current conditions. Then a reading is taken from a fast responding voltage meter, such as an oscilloscope, connected across the source at the instant of opening of the switch. This instantaneous voltage reading is divided by the current in the system to obtain the internal resistance of the electrochemical source. The shorter the interval of the open circuit condition the more certain it is that the polarization effect of the electrochemical device will be minimized.

The time of open circuit should be extremely short. To keep the interval short, perhaps as short as ten microseconds, the turn-on and turn-off must be very fast, sharp, and accurate so that a square current wave form results. It has been found that semiconductor switches do not have the desired turn-off characteristic and metallic contacts or mercury contacts do not have the desired turn-on time accuracy.

With this invention, means are provided that take advantage of the sharp turn-on characteristic of a semiconductor device, such as a silicon controlled rectifier, and that take advantage of the sharp turn-off characteristic of a metallic contact type device, such as a mercury switch. These advantages are combined to provide an accurate, cyclic, rapid, steeply sloped turn-on and turn-off characteristic.

The objects of this invention are to provide a new and improved switching device; a new and improved system for measuring the internal resistance of an electrochemical electrical source; to provide a new and improved switching system having a sharp turn-off and turn-on characteristic capability; and to provide means for determining the internal condition of an electrolysis cell such as a fuel cell or battery.

Figure 1:
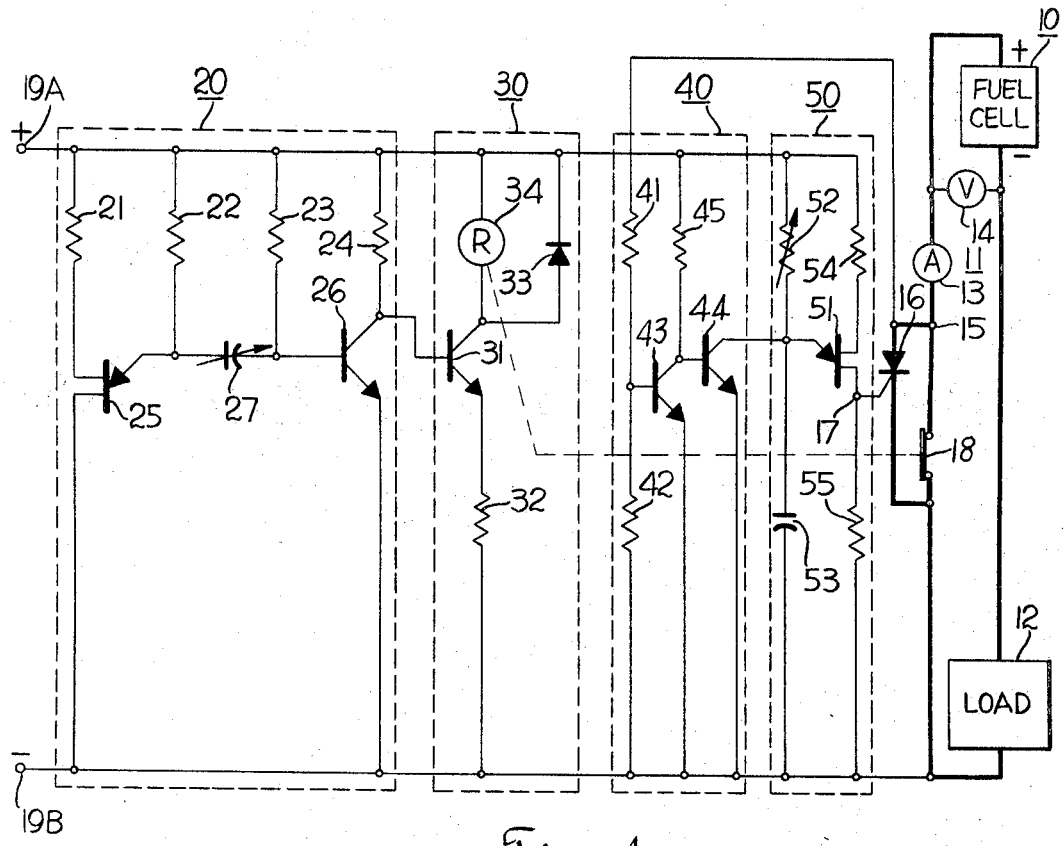
FIG. 1 is a drawing of an electrical system utilizing this invention.

Referring to FIG. 1, an electrochemical energy source, such as a fuel cell 10, that has the characteristics that could make it desirable to sample its internal resistance continuously, usually only during a test period, supplies current to a load 12. Fuel cell 10 provides current in a power circuit 11 that comprises fuel cell 10, load 12, and a pair of parallelly connected switching devices connected in parallel with each other and in series with the fuel cell and the load. These parallelly connected switching devices are a semiconductor switching device such as a silicon controlled rectifier 16 and a mechanical contact 18 which in most applications would be a rapidly oscillating mercury contact device. Contact 18 is controlled by a relay winding 34. An ammeter 13 is also connected in the power circuit and a rapid response voltage indicating device, such as an oscilloscope 14, is connected across the fuel cell output terminals.

While different types of contacts may be selected for particular applications, one type found satisfactorily operable is of a mercury solenoid type. This type has a metal contact rod controlled by the magnetic field of a relay winding to move into and out of a mercury pool. The mercury pool is connected to form one terminal and the contact rod the other terminal of a switch. This device and similar devices are known in the art.

A circuit power source, shown as having a positive terminal 19A and a negative terminal 19B, supplies potential for the control circuitry of the system.

A timing means 20 is provided for producing an adjustable oscillating or timed signal. This signal is delivered to a relay control means 30 that controls the position of contact 18.

An amplifying and switching means 40 is connected to be responsive to the current in power circuit 11 and control a time delay means 50 that produces a control signal to the gate of silicon controlled rectifier 16 after a selected time interval to turn the silicon controlled rectifier on.

Timing means 20 may be any similar circuit known in the art but is shown as an oscillator comprising resistors 21, 22, 23 and 24, a unijunction transistor 25, a transistor 26 and a variable capacitor 27. Timing means 20 oscillates at a frequency selected by the adjustment of variable capacitor 27. Capacitor 27 is charged through resistor 22 and the base-emitter circuit of transistor 26 until the voltage across capacitor 27 is sufficient to turn on unijunction transistor 25. Upon turning on of unijunction transistor 25, the positively charged plate of capacitor 27 is connected to negative terminal 19B of the current power source and capacitor 27 discharges through transistor 25, resistor 23 and source 19. The connection of capacitor 27 to the negative terminal 19B makes the base electrode of transistor 26 negative relative to terminal 19B and reverse biases transistor 26 to turn it off. Transistor 26 remains turned off until capacitor 27 discharges to a sufficiently low level to turn off transistor 25 and turn on transistor 26. Capacitor 27 then begins recharging through resistor 22 and the base-emitter circuit of transistor 26 to begin another cycle.

The collector of transistor 26 is connected to the base electrode of a transistor 31 in relay control means 30. When transistor 26 is turned off the base electrode of transistor 31 is made positive through resistor 24 and current flows from positive terminal 19A of the circuit power source through resistor 24, the base-emitter circuit of transistor 31, and a current limiting resistor 32 in the emitter circuit of transistor 31 to negative terminal 19B. Upon the turning on of transistor 31, current flows through relay winding 34 which moves contact 18 to its closed position. A diode 33 is connected in parallel with the relay winding to provide a discharge path for the reverse current induced in winding 34 when it is turned off. Contact 18 is cyclically opened and closed at intervals determined by the characteristics of timing means 20.

Switching and amplifying means 40 is connected to respond to the potential at a point 15 in power system 11 and comprises a resistor 41 and a resistor 42 that are connected to provide a voltage divider for biasing the base of a transistor 43. A transistor 44 responds to the condition of transistor 43 to turn on and off. With contact 18 closed, the voltage divider of resistors 41 and 42 provide a voltage at the base electrode of transistor 43 that is at the potential of negative terminal 19B (through contact 18) and transistor 43 is turned off. Upon the opening of contact 18, positive potential from the fuel cell output is supplied to the voltage divider of resistors 41 and 42 and the base electrode of transistor 43 becomes positive relative to negative terminal 19B and its emitter. Transistor 43 is thereby turned on with current flowing through its emitter-collector circuit and a resistor 45. This changes the potential of the base electrode of transistor 44 to a level to turn off transistor 44. Therefore, with contact 18 open transistor 43 is turned on and transistor 44 is turned off; and with contact 18 closed, transistor 43 is turned off and transistor 44 is turned on. As a result, amplifying and switching means 40 responds immediately to the condition of contact 18 to provide an output at the collector electrode of transistor 44.

This output of switching and amplifying means 40 is applied to timing delay means 50 which comprises unijunction transistor 51, a variable resistor 52, a capacitor 53, a resistor 54, and a resistor 55. When contact 18 is closed transistor 44 is on and capacitor 53 is short circuited through the emitter-collector circuit of transistor 44 and accumulates no charge. When contact 18 opens, transistor 44 is turned off and capacitor 53 charges through variable resistor 52. When the charge on capacitor 53 reaches the breakdown voltage of unijunction transistor 51, capacitor 53 discharges through unijunction transistor 51 and resistor 55. This discharge of capacitor 53 applies a positive pulse to a gate terminal 17 of silicon controlled rectifier 16 to turn it on. Thus, the turning on of silicon controlled rectifier 16 is responsive to the opening of contact 18 and occurs after a preselected time interval determined by the adjustment of variable resistance 52 in time delay means 50. This interval would generally be selected to be very short, on the order of ten microseconds, and provides an intermittent open condition in power circuit 11, when both controlled rectifier 16 and contact 12 are open, for determining the instantaneous open circuit voltage of the fuel cell.

Figure 2:
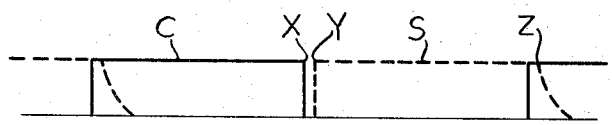
FIG. 2 is a graphic illustration of the current through a portion of the circuit shown in FIG. 1.

Referring to FIG. 2, the current through contact 18 is shown as a solid-line wave form C and the current through controlled rectifier 16 is shown as dashed-line wave form S. The described open circuit condition occurs between points X and Y. The relatively poor turn-off characteristic of a controlled rectifier and the relatively poor turn-on time characteristic of a mercury control are shown, with some exaggeration for clarity, at point Z. This system therefore utilizes the advantages of the very sharp turn-on characteristics of a silicon controlled rectifier and the very sharp turn-off characteristics of a metallic or mercury contact to provide square wave switching.

In describing the invention, the preferred embodiment has been shown and described, but it is obvious to one skilled in the art that there are many variations, combinations, alterations and modifications that may be made without departing from the spirit of the invention or from the scope of the appended claims.

The embodiments of the invention in which an exclusive property or privilege is claimed are defined as follows:

1. Means for determining the internal conditions of an electrochemical device under load conditions comprising:
   a load;
   a first switching device having desirable turn-on characteristics and a second switching device having desirable turn-off characteristics connected parallel to each other and in series with the load and the electrochemical device, said first device being connected to be turned off in response to the turning on of the second device;
   oscillator means for cyclically turning the second device on and off;
   means responsive to the turning off of the second device to turn on the first device after a preselected interval, said interval selected to be short enough to provide a voltage indicating the instantaneous internal conditions of the electrochemical device under load conditions; and
   means connected across the terminals of said electrochemical device for measuring the voltage.

2. Means for determining the internal condition of an electrochemical device under load conditions comprising:
   a load;
   a first switching device having desirable turn-on characteristics and a second switching device connected parallel to each other and to connect the load to the electrochemical device, said first switching device connected to be responsive to the position of the second switching device to turn off said first switching device when said second switching device closes;
   oscillator means for cyclically turning the second switching device on and off;
   means responsive to the position of the second switching device to turn on the first switching device a preselected interval after the second switching device turns off, said interval selected to be short enough to provide a voltage indicating the internal conditions of the fuel cell under load conditions; and
   means connected across the terminals of said electrochemical device for measuring the voltage.

3. Means for determining the internal resistance of a fuel cell under load conditions comprising:
   a load;
   a semiconductor switching device and an electromechanical switching device connected parallel to each other and in series with the load and the fuel cell, said semiconductor device and said electromechanical switching device being connected to turn off said semiconductor device when said electromechanical device closes;
   free-running oscillator means for cyclically turning the electromechanical device on and off;
   means responsive to the turning off of the electromechanical device to turn on the semiconductor device after a preselected interval, said interval selected to be short enough to provide a voltage indicating the internal characteristics of the fuel cell under load conditions; and
   means connected across the terminals of said fuel cell for measuring the voltage.

4. Means for determining the internal resistance of a fuel cell under load conditions comprising:
a load;
a silicon controlled rectifier and a solenoid switch connected parallel to each other and in series with the load and the fuel cell, said silicon controlled rectifier and said switch being connected to turn off the silicon controlled rectifier when said switch closes;
oscillator means for cyclically turning the solenoid switch on and off;
adjustable time delay means responsive to the turning off of the mercury solenoid to turn on the silicon controlled rectifier after a preselected interval, said interval selected to be short enough to provide a voltage indicating the internal characteristics of the fuel cell under load conditions; and
means connected across the terminals of said fuel cell for measuring the voltage.

5. Means for determining the internal resistance of a fuel cell under load conditions comprising:
a load;
a silicon controlled rectifier and a solenoid switch connected parallel to each other and in series with the load and the fuel cell, said silicon controlled rectifier and said solenoid switch being connected to turn off the silicon controlled rectifier when said switch closes;
free-running timing means for producing an oscillating output;
means responsive to the oscillating output for cyclically turning the solenoid switch on and off;
a semiconductor switching and amplifying means responsive to the position of the solenoid switch to turn on the silicon controlled rectifier after a preselected interval after the opening of the solenoid switch, said interval selected to be short enough to provide a voltage indicating the internal characteristics of the fuel cell under load conditions; and
means connected across the terminals of said fuel cell for measuring the voltage.

6. Switching means for providing a desirable turn-on and turn-off characteristic for a relatively large power electrical system supplying a load, said switching means comprising:
a first switching device having a desirable turn-on characteristic;
a second switching device having a desirable turn-off characteristic, said first and second devices connected parallel to each other between said power electrical system and said load;
oscillator means for cyclically turning the second device on and off;
means responsive to the turning off of the second device to turn on the first device after a preselected interval; and
said first device being connected to be turned off in response to the turning on of the second device.

7. Switching means for providing a sharp turn-on and turn-off characteristic for a relatively large power electrical system supplying a load, said switching means comprising:
a first switching device having a sharp turn-on characteristic;
a second switching device having a sharp turn-off characteristic, said first and second devices connected parallel to each other and in series with said power system and said load;
free-running oscillator means for cyclically turning the second device on and off; and
means responsive to the turning off of the second device to turn on the first device a preselected interval after the second device turns off;
the turning on of the second device shunting the first device to turn it off.

8. Switching means for providing a fast turn-on and turn-off characteristic for a relatively large power electrical system supplying a load, said switching means comprising:
a semiconductor switching device;
an electromechanical switching device, said switching devices connected parallel to each other and in series with said power system and said load;
oscillator means for periodically turning the electromechanical device on and off;
means responsive to the turning off of the electromechanical device to turn on the semiconductor device after a preselected interval, and
said semiconductor switching device being connected to be turned off in response to the turning on of the electromechanical device.

9. Switching means for providing a fast turn-on and turn-off characteristic for a relatively large power electrical system to disconnect it from a load for very short intervals, said switching means comprising:
a silicon controlled rectifier;
a mercury solenoid switch, said rectifier and switch being connected parallel to each other and in series with the power system and load to connect and disconnect said power system and the load, and said switch and said rectifier being connected to turn off the rectifier when the switch turns on;
free-running oscillator means for cyclically turning the switch on and off; and
means responsive to the turning off of the switch to turn on the rectifier after a preselected interval.

10. Switching means for providing a sharp turn-on and turn-off characteristic for a relatively large power electrical system to disconnect it from a load for very short intervals, said switching means comprising:
a silicon controlled rectifier;
a mercury solenoid switch, said rectifier and switch connected parallel to each other and in series with the power system and load to control the connection of the power system to the load; said rectifier being connected to be shunted and turned off by the turning on of said switch;
timing means for periodically producing an oscillating output of preselected frequency;
means for cyclically turning the switch on and off in response to the oscillating output; and
semiconductor means responsive to the position of the solenoid switch to turn on the rectifier a preselected interval after the solenoid switch opens.

References Cited

UNITED STATES PATENTS

| | | | |
|---|---|---|---|
| 2,853,676 | 9/1958 | Ellis | 324—29.5 |
| 2,864,055 | 12/1958 | Kordesch et al. | 324—29.5 |
| 3,325,657 | 6/1967 | Corey. | |
| 3,350,606 | 10/1967 | Hirsch | 317—22 |

ARCHIE R. BORCHELT, *Primary Examiner.*

C. F. ROBERTS, *Assistant Examiner.*